May 17, 1949. H. OBRIST 2,470,517
VARIABLE PITCH PROPELLER
Filed March 27, 1945 2 Sheets-Sheet 1
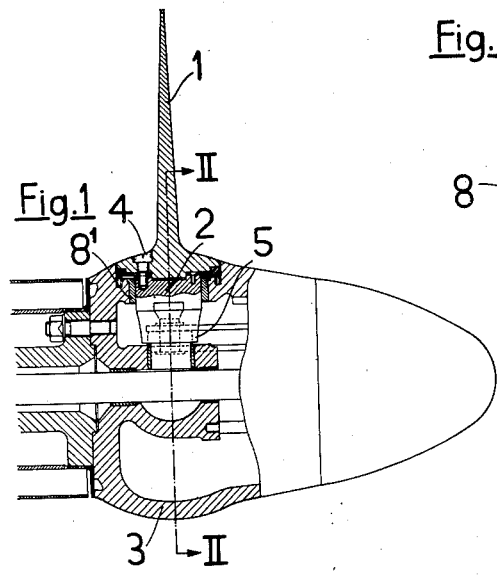
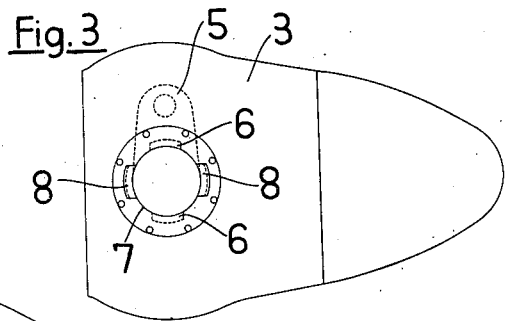
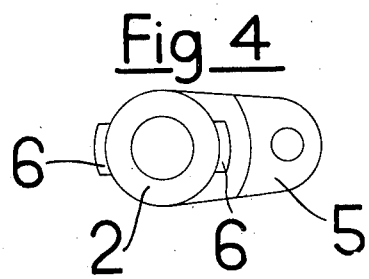
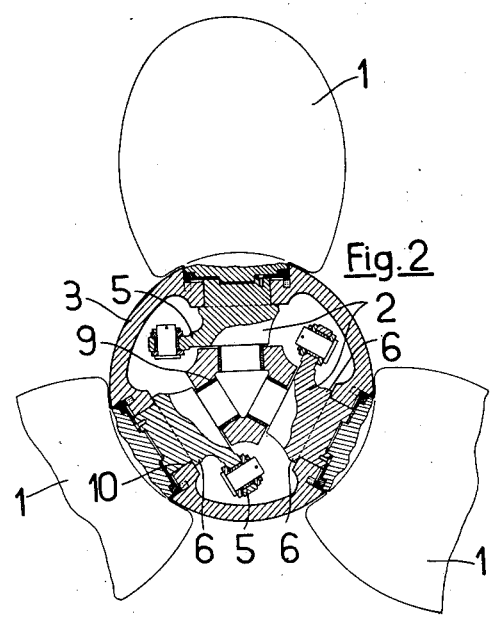
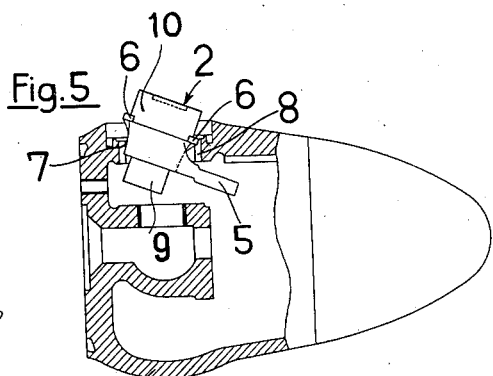
Inventor
Heinrich Obrist
By Dodge
Attorneys

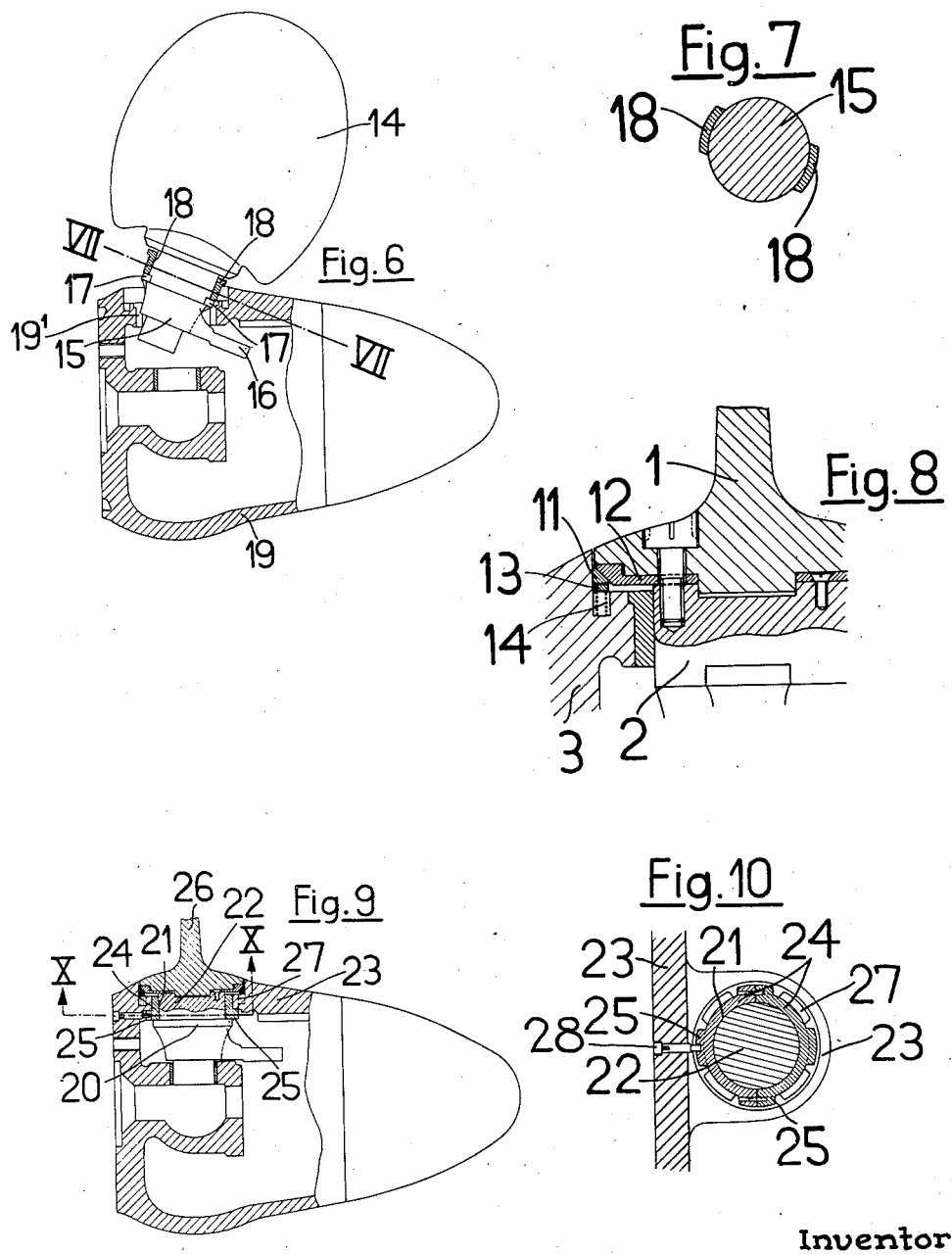

Patented May 17, 1949

2,470,517

UNITED STATES PATENT OFFICE 2,470,517

VARIABLE-PITCH PROPELLER

Heinrich Obrist, Zurich, Switzerland, assignor to Escher Wyss Maschinenfabriken Aktiengesellschaft, Zurich, Switzerland, a corporation of Switzerland Application March 27, 1945, Serial No. 585,039
In Switzerland April 27, 1944

2 Claims. (Cl. 170—160.24)

This invention relates to a variable-pitch propeller for ships, aircraft and centrifugal machines, provided with cranks for varying the pitch of the propeller blades, each of the cranks being formed integral with its correlated blade root.

To simplify the assembly of propellers of this kind it has already been proposed to split the hub into two parts in the plane through the axis of rotation of the blade root or in a plane parallel thereto. Such splitting of the hub can readily be adopted where smaller propellers and relatively small thrusts are concerned, but is no longer suitable as soon as large bearing forces and adjusting forces have to be dealt with, since then the available space proves too small for accommodating sufficiently strong connecting members.

In an endeavour to overcome this difficulty in a variable-pitch propeller according to the present invention the members which serve simultaneously as blade roots and adjusting cranks can be inserted into the unsplit hub through openings provided therein and having at least two recesses projecting radially outwards, said members, after having been adjusted relatively to said recess, being held fast in the propeller hub in a radial direction by at least two projections provided on these members and resting against the inner surface of the hub.

The accompanying drawing shows by way of example constructional embodiments of the subject matter of the invention. In this drawing:

Fig. 1 shows an axial longitudinal section through part of a variable-pitch ship propeller, in which each blade is bolted to its root, the latter being supported in the propeller hub.

Fig. 2 shows a section on the line II—II of Fig. 1,

Fig. 3 shows a plan view of the propeller hub in which the blades have so far not been inserted, hyphenated lines indicating an adjusting crank in the position in which it would lock its correlated blade in the radial direction.

Fig. 4 shows a plan view of a blade root together with its adjusting crank which forms an integral part thereof, this member being illustrated in the approximate position into which it has to be brought for insertion in the hub when the latter is in the position shown in Fig. 3.

Fig. 5 shows how a member consisting of a blade root and an adjusting crank can be inserted in the hub.

Fig. 6 shows the same as Fig. 5 for the case where the propeller blade is formed integral with its root and with the adjusting crank.

Fig. 7 shows a section on the line VII—VII of Fig. 6, intermediate pieces being also indicated which are placed in grooves in the propeller hub after the blade root has been inserted in this hub.

Fig. 8 shows on a larger scale the sealing means which are provided at the points where the blade roots are supported in the propeller hub.

Fig. 9 shows an axial longitudinal section through part of a further embodiment of the invention, and Fig. 10 is a section on the line X—X of Fig. 9.

In Figs. 1 to 5 is shown a three-blade variable-pitch ship propeller the blades 1 of which are detachably secured to their roots 2 by means of bolts 4. The blade roots 2 are movably supported in the propeller 3 by means of a trunnion 9 at the inner end of the root and by a journal 10 which is located just within the periphery of the hub and each of them is formed integral with a correlated adjusting crank 5 cast-on to the respective root between said trunnion 9 and said journal 10. The various cranks 5 are operatively connected to an adjusting mechanism known per se and which has nothing to do with the essential features of the invention so that it is neither shown in the drawing nor hereinafter described.

To ensure that the root 2, after the correlated blade 1 has been moved into the necessary position, is locked in the radial direction in the hub 3, two projections 6 arranged opposite to one another are provided on each blade root 2, these projections being formed likewise integral with the root in this embodiment of the invention. For inserting in the hub 3 in the manner indicated in Fig. 5 the various members composed each of a root 2, an adjusting crank 5 and two projections 6, bores 7 having each two recesses 8 projecting radially outwards are provided in the hubs 3 (Figs. 3 and 5). The cross section of the recesses 8 is somewhat greater than that of the projections 6.

The operation of mounting a blade root 2 in the hub is carried out as follows. The root 2 is so positioned (see, for example, Fig. 6) that its bayonet lugs 6 can be introduced through recesses 8. After such introduction and the insertion of the trunnion 9 into the bearing provided therefor near the center of the hub the root and its attached adjusting crank are turned about 90° so that the lugs 6 are displaced from the recesses 8 through which they entered, and engage an arcuate seat formed therefor on the internal face of the hub. The position which results is illustrated in dotted lines in Figure 3. In this position the projections 6 act as a lock with regard to the centrifugal forces exerted on the correlated blade 1 in that they rest directly against the inner surface of the hub 3. In the radial direction the root 2 that has been inserted into the hub 3 is supported near its inner end by trunnion 9 and near its outer end its journal 10 (see Fig. 2) and is held between inserted pieces 8' which function as bearings and which are inserted into the recesses 8 after the root is in position.

Thus, in the embodiment herein described the usual well-tried method of supporting the blade roots 2 in the hub 3 is possible; furthermore an extremely reliable connection between root 2 and adjusting crank 5 is secured, and thirdly an easy insertion of the blade roots together with the adjusting cranks in the hub 3 is possible, and this without the necessity of providing in the hub particularly large bores which would reduce its strength.

In Fig. 8 is illustrated on a larger scale how the sealing of the propeller root 2 is attained at the point where it is inserted in the propeller hub 3. In this Fig. 8 the numeral 11 denotes a ring forming the sealing member proper and 12 is a disc connected to the blade root 2 in a manner permitting of its being unscrewed. The sealing ring 11 also rests against a metallic ring 13, which a number of springs 14 force against ring 11, so that the external surfaces of the latter bear tightly against hub 3 and disc 12.

As illustrated in Fig. 6 the invention is also suited for application when the propeller blade 14 and the root 15 are formed integral with the adjusting crank 16 and with the projection 17 serving as locking means. In this case also intermediate pieces 18 are placed in grooves 19¹ of the hub 19 after the parts 14, 15, 16 and 17 have been inserted, the cross section of said intermediate pieces 18 being somewhat smaller than the cross section of the grooves 19¹ in the propeller hub 19 which have to be provided for the introduction of the projections 17. These pieces 18 act also as bearing surfaces for the blade root 15.

In both the embodiments above described the bayonet locking lugs 6 (Figs. 1-5) and 17 (Figs. 6 and 7) are formed integrally with the root. As will be noted from an examination of the above-mentioned figures the lugs are located adjacent the inward end of the journal 10 and project radially outward beyond the surface of said journal to engage the seat formed on the interior surface of the hub. From this last circumstance it follows that the bayonet locking lugs are loaded unidirectionally. They simply resist forces which tend to move the root outward in a radial direction relatively to the hub. Any arrangement which will resist such unidirectional force will meet the requirements, and accordingly simple alternative structures may readily be contrived. One very desirable arrangement is shown in Figures 9 and 10.

In these figures a shoulder or flange 20 is formed on the root 22 at the inward end of the journal 21. A sleeve-like bushing or bearing element 24 fills the annular space between the journal 21 and the margin of the larger aperture in the hub 23. With such an arrangement it is conveniently possible to use four bayonet lugs 25 to resist the centrifugal tendency of the root 22 and the blade 26. The use of four bayonet lugs entails the use of four recesses 27. The lugs are formed directly on the bearing element 24.

After the bearing element has been placed and turned to engage the locking lugs it is fixed in position by a stake 28.

Thus it will be seen that while it is characteristic of the invention that the bayonet locking lugs are sustained by the root against displacement in an axial direction toward the trunnion end of the root, this is really all that is strictly required. Consequently, while it is possible and often convenient to form these lugs integrally with the root, it is not strictly essential that they be so formed. In cases such as that illustrated in Figs. 9 and 10 it is preferred to sustain them so that they react against the root but are not integral therewith.

What is claimed is:

1. In a variable pitch propeller, the combination of a hollow hub having its peripheral portion constructed as a continuous un-split shell, said hub having near its axis a plurality of radially disposed bearings one for each blade root and a plurality of generally circular apertures in said peripheral portion and respectively centered on the axes of corresponding radially disposed bearings, each aperture having opposed notches for the passage of bayonet locking lugs; a plurality of blades each having a root, each of said roots having at its inner end a trunnion adapted to work in a corresponding radially disposed bearing and having near its outer end a journal the diameter of which is slightly less than that of a corresponding one of said apertures, each root having between said journal and trunnion an integral arm radial to the axis of the root; bayonet locking lugs sustained by respective roots against relative axial displacement at least in the direction toward the trunnion end thereof, said lugs having connection with and projecting radially outward beyond the journal adjacent the inward end thereof, said lugs being dimensioned to enter said shell through said notches and engage the inner surface of the shell; and bearing-forming means interposed between each journal and the surrounding portion of said shell.

2. The combination defined in claim 1 in which the root is formed with a shoulder defining the inner end of the journal, and the bearing-forming means is in the form of a ring which encircles the journal, seats against said shoulder, fills the annular interval between the journal and the margin of the corresponding aperture, and carries the bayonet locking lugs.

HEINRICH OBRIST.

REFERENCES CITED

The following references are of record in the file of this patent:

UNITED STATES PATENTS

| Number | Name | Date |
|---|---|---|
| 2,002,735 | Fuchs | May 28, 1935 |
| 2,118,653 | Meijer | May 24, 1938 |

FOREIGN PATENTS

| Number | Country | Date |
|---|---|---|
| 447,950 | Great Britain | May 28, 1936 |